United States Patent [19]

Mahler et al.

[11] 4,213,949

[45] Jul. 22, 1980

[54] PROCESS OF PREPARING PARTICULATE POLY(ALUMINO-SILICATE)

[75] Inventors: Walter Mahler; William O. Forshey, Jr., both of Wilmington, Del.

[73] Assignee: E. I. Du Pont de Nemours and Company, Wilmington, Del.

[21] Appl. No.: 972,421

[22] Filed: Dec. 22, 1978

[51] Int. Cl.$^2$ .................... C01B 33/26; C01B 33/28
[52] U.S. Cl. ................ 423/329; 106/288 B; 423/328
[58] Field of Search ............... 423/328–330; 106/288 B; 253/455 R, 455 Z

[56] References Cited

U.S. PATENT DOCUMENTS

| | | | |
|---|---|---|---|
| 1,642,880 | 9/1927 | Kriegsheim et al. | 423/329 |
| 1,949,360 | 2/1934 | Schorger | 423/329 |
| 2,278,746 | 4/1942 | Sturgeon | 252/452 |
| 2,315,024 | 3/1943 | Sturgeon | 208/120 |
| 2,927,902 | 3/1960 | Cramer et al. | 252/463 |
| 2,999,734 | 9/1961 | Weber et al. | 423/329 |
| 3,228,784 | 1/1966 | Mays et al. | 106/288 |
| 3,457,191 | 7/1969 | Erickson et al. | 252/455 |
| 3,481,699 | 12/1969 | Domine et al. | 423/329 |

Primary Examiner—Edward J. Meros

[57] ABSTRACT

In a process for preparing particulate, porous, water-insoluble amorphous poly(alumino-silicate) having a Si/Al gram-atomic ratio of about 1:1 to 10:1, a pore volume of greater than 0.5 ml/g, an average pore diameter of 50 to 200 Å and a surface area of 200 to 600 m$^2$/g by mixing an aqueous solution of an appropriate aluminate and an aqueous solution of an appropriate silicate, allowing the aluminate and silicate in the resultant mixture to polymerize to poly(alumino-silicate), freezing the mixture and thereafter isolating, washing, drying and recovering particulate poly(alumino-silicate) therefrom, said process characterized in that:

(a) the amounts, respectively, of aluminate and silicate, calculated as $Al_2O_3$ and $SiO_2$, are such that the total amount thereof in the mixture is about 4 to 25 weight % of the mixture, such that the Si/Al gram-atomic ratio in the mixture is about 1:1 to 10:1, and such that the amount, in the mixture, of at least one water-soluble compound which is precipitable from the mixture at $-10°$ to $-100°$ C. and which is inert to the aluminate, silicate and poly(alumino-silicate) is about 25 to 160 weight %, based on the combined weights of aluminate and silicate, calculated as $Al_2O_3$ and $SiO_2$; and (b) the mixture is cooled to about $-10°$ to $-100°$ C. until it is frozen, to separate substantially all of the chemically unbound water as substantially pure ice and to precipitate water-soluble compound within the pores of the poly(alumino-silicate) particles being formed.

16 Claims, 1 Drawing Figure

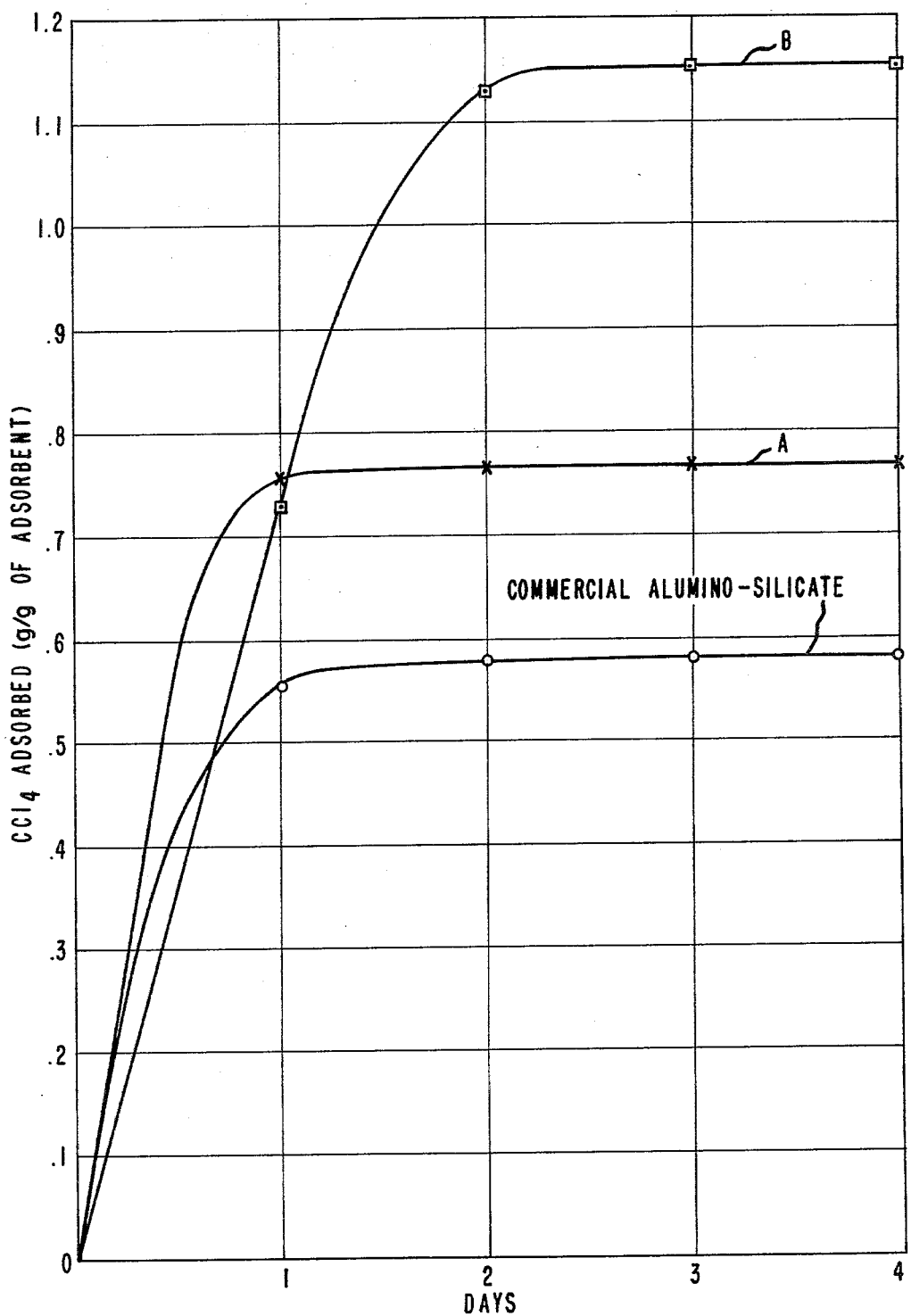

PROCESS OF PREPARING PARTICULATE POLY(ALUMINO-SILICATE)

TECHNICAL FIELD

This invention relates to poly(alumino-silicate) having a desirable combination of physical and chemical properties.

One object of this invention is to provide a novel process for preparing such a poly(alumino-silicate). Another object is to provide a particulate poly(alumino-silicate) having high porosity, high surface area and a narrow distribution of pore sizes. A further object is to provide a poly(alumino-silicate) that is useful as a catalyst or catalyst component, adsorbent, detergent builder and ion-exchange material.

BACKGROUND ART

U.S. Pat. No. 1,949,360 discloses a process of preparing alumino-silicate particles by mixing aqueous solutions of sodium silicate and sodium aluminate, allowing the mixture of solutions to gel, freezing the gel at $-10°$ to $-5°$ C. without freezing or precipitating solutes contained therein, and thereafter thawing the gel and isolating, washing and drying the resultant particulate product. The art teaches, in general, that dissolved impurities or by-products, such as salts, either should be removed from the gel before it is frozen or they should not be allowed to precipitate during the gel-freezing step.

BRIEF DESCRIPTION OF DRAWING

In the accompanying drawing forming a material part of this disclosure are plotted data of Example 2 hereof showing the adsorption capabilities of particulate poly(alumino-silicate) prepared by means of this invention, particulate poly(alumino-silicate) prepared by a procedure outside this invention and common, commercially available alumino-silicate particles.

DISCLOSURE OF INVENTION

For further comprehension of the invention, and of the objects and advantages thereof, reference may be made to the following description and to the appended claims in which the various novel features of the invention are more particularly set forth.

This invention resides in the preparation of particulate, porous, water-insoluble amorphous poly(alumino-silicate) which has a Si/Al gram-atomic ratio of about 1:1 to 10:1 and which is characterized by a pore volume of greater than 0.5 ml/g, an average pore diameter of about 50 to 200 A and a surface area of about 200 to 600 m²/g. More specifically, the invention resides in a process for preparing particulate poly(alumino-silicate) by mixing an aqueous solution of an appropriate aluminate and an aqueous solution of an appropriate silicate, allowing the aluminate and silicate in the resultant mixture to polymerize to poly(alumino-silicate), freezing the mixture and thereafter thawing the mixture and isolating, washing, drying and recovering particulate poly(alumino-silicate) therefrom, said process characterized in that:

(1) the amounts, respectively, of aluminate and silicate, calculated as $Al_2O_3$ and $SiO_2$, are such that the total amount thereof in the mixture is about 4 to 25 weight % of the mixture, such that the Si/Al gram-atomic ratio in the mixture is about 1:1 to 10:1, and such that the amount, in the mixture, of at least one water-soluble compound which is precipitable from the mixture at $-10°$ to $-100°$ C. and which is inert to the aluminate, silicate and poly(alumino-silicate) is about 25 to 160%, by weight, based on the combined weights of aluminate and silicate, calculated as $Al_2O_3$ and $SiO_2$;

(2) optionally, but preferably, the mixture of aluminate and silicate is allowed to gel and, optionally, but preferably, the mixture is aged, preferably for no longer than 60 minutes at room temperature, before it is frozen; and (3) the mixture is cooled to about $-10°$ to $-100°$ C. until it is frozen, to separate substantially all of the chemically unbound water as substantially pure ice and to precipitate water-soluble compound within the pores of the poly(alumino-silicate) particles being formed.

Two solutions can be mixed to form the desired poly(alumino-silicate). They are, respectively, aqueous solutions of an alkali metal silicate and an alkali metal aluminate; the alkali metal, for convenience and economy, generally is sodium. The silicate solution can be prepared either by dissolving commercially available sodium silicate in water or, preferably, by diluting a commercially available concentrated aqueous solution of sodium silicate with water to the desired strength. By sodium silicate is meant the compound of the approximate formula $Na_2O \cdot (SiO_2)_x$ wherein x is a number such that the compound dissolves in water in such an amount that the $SiO_2$ content of the resultant aqueous solution is 5 to 30 weight %. This requirement is met by, but not limited to, commercially available sodium silicate in which x is 1 to 4. Aqueous sodium silicate solutions which are operable herein generally exhibit a pH of at least 10.

The aluminate solution can be prepared by dissolving in water commercially available granular sodium aluminate of the approximate formula $Na_2O \cdot Al_2O_3 \cdot 3H_2O$. Aqueous solutions of sodium aluminate operable herein also generally exhibit a pH of at least 10.

The concentrations of silicate and aluminate in the respective aqueous solutions are adjusted so that the total silicate and aluminate concentration, calculated as $SiO_2$ and $Al_2O_3$, respectively, is about 4 to 25%, by weight, preferably about 5 to 15%, by weight, of the weight of the mixture of solutions (and the preferred ultimate gel) and so that the Si/Al gram-atomic ratio in the mixture (and preferred ultimate gel) is about 1:1 to 10:1, preferably, about 1.5:1 to 7:1.

The at least one, precipitable, water-soluble compound which is essential to the invention can be provided in one or more of the following ways: (i) as a by-product of the poly(alumino-silicate)-forming reaction produced when the silicate and aluminate solutions are combined; (ii) by direct addition of a suitable compound or compounds to one or both of said solutions; and (iii) by partially neutralizing one or both of said strongly alkaline solutions before they are mixed.

The reaction of aqueous sodium silicate and aluminate solutions may be postulated as:

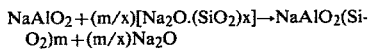

wherein x is as defined above and m is the Si/Al gram-atomic combining ratio, that is, 1:1 to 10:1. The alkali metal by-product is in the form of the hydroxide, the formation of which, in the above reaction, can be represented by:

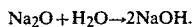

By-product alkali metal hydroxide is retained in aqueous solution in the mixture, for example, the gel, containing poly(alumino-silicate) and contributes to the aforesaid solute requirement of the invention. The alkali metal hydroxide generally is at a concentration of about 25 to 85%, by weight, of the ($SiO_2 + Al_2O_3$) content of the mixture.

As already indicated, the concentration of precipitable, water-soluble, inert solute in the mixture can be adjusted by adding a suitable compound (or compounds) to one or both of the aforesaid aluminate and silicate solutions.

Suitable water-soluble, precipitable (from the aqueous mixture at $-10°$ to $-100°$ C.) compounds which are chemically inert to the alumino-silicate system can be selected from: (i) salts of alkali and alkaline earth metal and ammonium cations and mineral acids, such as sulfuric, hydrochloric and nitric acids, or organic acids, such as formic, acetic, oxalic and citric acids; (ii) soluble alkali metal hydroxides and carbonates; and (iii) alkaline or neutral, water-soluble organic compounds. The above list is intended to be representative, not by any means all inclusive or exclusive. Examples of (i) include $NH_4NO_3$, $NaCl$, $LiCl$, $CaCl_2$, $Na_2SO_4$, $NaNO_3$, $CH_3CO_2Na$, $HCO_2Na$ and $Na_2C_2O_4$; examples of (ii) include $NaOH$ and $Na_2CO_3$; examples of (iii) include ethanolamine, triethanolamine, morpholine, sorbitol and sucrose.

The water-soluble precipitable additive (or additives) can be dissolved in the starting solutions described above in such an amount that the total additive concentration is up to about 135%, by weight, of the combined weights of silicate and aluminate, calculated as $SiO_2$ and $Al_2O_3$, respectively.

An alternative way to provide precipitable solute is, as disclosed above, by an in situ synthesis wherein the alkali metal silicate and/or the alkali metal aluminate aqueous solutions are partially neutralized with an organic or inorganic acid, such as disclosed above, for example, sulfuric acid. Such partial neutralization must not, however, lower the pH of either starting solution below about 10. Such in situ synthesis does not change the number of moles of precipitable solute but changes its chemical nature, for example, from NaOH to a mixture of $NaOH$ and $Na_2SO_4$.

The total precipitable solute concentration, attained in one or more of the ways discussed above, in the mixture of aluminate and silicate, generally is about 25 to 160%, by weight, of the combined weights of silicate and aluminate, calculated as $SiO_2$ and $Al_2O_3$, respectively.

The optimum concentration of solute depends on the intended use for the final poly(alumino-silicate) particles. For adsorbent uses in which high pore volume and high surface area, but only moderate pore diameters, are required, a total solute concentration of approximately 25 to 75%, by weight, of the total ($SiO_2 + Al_2O_3$) concentration is preferred. For catalyst applications in which larger pore diameters, combined with high pore volume and high surface area, are required, a solute concentration of approximately 75 to 160%, by weight, of the total ($SiO_2 + Al_2O_3$) concentration is preferred.

The silicate and aluminate solutions should be well stirred and mixed as rapidly as possible to provide maximum uniformity of the mixture and the ultimate gel, if a gel is formed, as is usually the case. Mixing can be achieved simply by rapidly pouring the two solutions, contained in separate vessels, into a large third vessel, with good agitation. It is preferable, however, to employ a mixing nozzle, such as described by A. Weissberger in "Techniques of Organic Chemistry", Vol. VIII, Part II (Interscience, 1963), p. 709, preferably, a multiple-jet mixing nozzle, to ensure complete and rapid mixing and to permit use of aqueous solutions which are more concentrated than can be homogeneously mixed, in a batch type operation, because of the rapid increase in viscosity due to the polymerization (and, usually, gelation) which takes place in the mixture.

Sufficiently concentrated alumino-silicate solutions gel, presumably because of the formation of an extensively copolymerized amorphous alumino-silicate structure. Gel time, which varies with the Si/Al ratio, solution concentration and temperature, generally is less than 5 minutes, frequently less than 10 seconds. Gel times tend to increase with increasing Si/Al ratio and decreasing concentration.

In preparing the poly(alumino-silicate) particles of this invention, it has been found beneficial to the stability of the final alumino-silicate structure to allow the freshly-prepared alumino-silicate solution to gel and then to mature (age) the gel at room temperature for a period of up to about 60 minutes, preferably about 4 to 30 minutes, prior to freezing of the gel. During aging, the gel can be allowed to remain quiescent or it can be granulated mechanically to render it more manageable in subsequent processing steps.

The aged gel, preferably in granulated form, is frozen at a temperature of about $-10°$ to $-100°$ C., preferably at about $-15°$ to $-35°$ C., a particularly economical, commercially feasible freezing range, until the gel has solidified completely. One convenient procedure for freezing the gel is to pour gel granules directly into a liquid refrigerant, such as Freon ® 113 Refrigerant, maintained at the gel freezing temperature. This method facilitates rapid transfer of heat from the gel, which thus quickly reaches the refrigerant temperature. In a preferred embodiment of the invention, the solutions of silicate and aluminate, each optionally containing one or more water-soluble additives, are rapidly combined at a mixing nozzle; optionally, allowed to stand for up to about 60 minutes; conveyed to a granulating device; granulated to approximately 3.175 mm particles; and discharged into Freon ® 113 Refrigerant maintained at $-25°$ C. Gel granules can be frozen sequentially at such a rate that the product exiting from the mixing nozzle has been aged for about 1 to 60 minutes, preferably about 4 to 30 minutes, prior to freezing.

The physical and chemical mechanisms which operate during the gelation, aging and freezing steps are substantially completed when the gel is completely frozen. Gels can be kept in the frozen state for a substantial length of time. Storage times of five minutes to two hours have been found convenient, from a processing standpoint.

Although it is in no way intended to characterize the process of this invention by any particular mechanism, it is believed that a major factor contributing to the establishment of large pores, and a high surface area, in the product of this invention is the separation from the poly(alumino-silicate), during freezing, of relatively pure ice crystals, which progressively compress the poly(alumino-silicate) structure. As ice separation continues, the aforesaid dissolved solute begins to precipitate within the structure as the concentration of the solute increases in the decreasing amount of liquid water. This process continues until all but chemically bound water has separated from the poly(alumino-silicate) structure as ice, the highly compressed structure has fragmented into particles or flakes, and substantially all dissolved solute has precipitated within the pores of the poly(alumino-silicate) particles. The precipitation of solute within the pores is believed to be critical to the development and maintenance of a stable network of relatively large pores, which might otherwise collapse, partially or completely, under the forces imposed by ice crystallization. The effects of freezing and of the progressively increasing solute concentration on the pore volumes and the pore diameters of the final poly(alumino-silicate) product are dramatic (Examples 1 and 2).

The frozen mixture can be removed from the freezing bath, allowed to thaw, either in air or in water, and the particles can be separated therefrom by filtration. They usually are washed with water, preferably deionized water, to remove soluble materials, including the precipitable solutes. The removal of soluble materials from the poly(alumino-silicate) particles of this invention is essential if usage of the particles involves high temperatures, because the soluble materials may adversely affect the thermal stability of the particles at high temperatures. The product of this invention, when used as a catalyst or catalyst component, may commonly be exposed to temperatures as high as 600° C.

It has been found that a portion of alkali metal ions (e.g. Na+) introduced with the alkali metal aluminate/silicate starting solutions remains chemically bound in the poly(alumino-silicate) product, which may be represented approximately by the formula $MAlO_2(SiO_2)m$ wherein M is an alkali metal and m is as defined above. These metal ions are not removed by water washing and their presence in the product also may adversely affect the thermal stability of the product. Such ions can be substantially removed, when such removal is desired, by following the initial water wash with washes of dilute mineral acid, preferably sulfuric acid or nitric acid. Such acid treatment leaches much of the chemically-bound metal ions from the alumino-silicate particles, replacing the ions with hydrogen ions. Mineral acid washes can be followed by further water washes until the filtrate is substantially free of acid anions, e.g. $SO_4^=$ or $NO_3^-$.

Alternatively, the alkali metal ion content of the poly(alumino-silicate) particles can be reduced by washing the particles with an aqueous solution of an ammonium salt, such as $(NH_4)_2CO_3$ or $NH_4NO_3$, until the desired low concentration of alkali metal ion is attained. In this case, the alkali metal ions are replaced by $NH_4^+$ ions. The particles then can be washed further with water and dried under customary drying conditions, e.g., at a temperature of about 105° to 250° C.

As another alternative, both types of washes, that is, an acid wash and an aqueous ammonium salt wash, can be employed to remove undesirable residual alkali metal ions, preferably in a countercurrent washing technique, as described below. For certain uses, such as ion-exchange or detergent building, particle washing can be curtailed or omitted altogether if the presence of alkali metal ions in the alumino-silicate structure is desirable.

Washing of particles using well-known countercurrent techniques and equipment, such as disclosed in U.S. Pat. No. 3,881,876, provides a particularly effective means for removing soluble materials. The product obtained upon thawing the frozen mixture can be passed as a slurry, containing about 10 to 40 wt % solids, downward through the washing column. Simultaneously, deionized water can be slowly passed, countercurrent to the solids flow, upwards through the column, being introduced just below the bottom or exit plate in, e.g. a twenty-plate column. To facilitate removal of metal ions from the particles, a dilute aqueous acid, preferably sulfuric acid or nitric acid, can be introduced about five plates above the exit plate. The poly(alumino-silicate) particles are thus washed by a continuous countercurrent flow of dilute acid for the upper fifteen column plates and by a countercurrent flow of deionized water in the final five plates to remove the final traces of dissolved salts and dilute acid anions.

Sharygin et al, Kinet. Katal. 11 (1), 187 (1970); Russ. J. Phys. Chem., 42 (8), 1124 (1968); and Kolloid Zh., 31 (3), 459 (1969), disclose that the capillary forces resulting from the surface tension of liquid water in contact with the internal surfaces of water-wet siliceous particles prepared by a freezing process can be sufficient to cause partial collapse of the porous structure during water removal in the final drying step. They further disclose that the displacement of water from siliceous particles with a water-soluble organic liquid, such as ethanol or diethyl ether, having a low surface tension, followed by vaporization of the liquid at or above its critical temperature, substantially preserves the porous structure of the particles, but that removal of such organic liquids at sub-critical temperatures, for example 115° C., actually reduces porosity and pore volume.

In the preferred washing procedure of the present invention process, the final water wash is followed by washing with a water-soluble organic liquid; acetone is especially preferred. The washed particles are finally dried at a temperature of about 105° to 200° C., preferably at 115° to 150° C. Although such a temperature is substantially below the critical temperature of acetone (235.5° C.), the porosity of the poly(alumino-silicate) particles is increased (Example 7). Wash liquid removal at sub-critical temperatures reduces costs and energy consumption significantly.

The products obtained herein, either with or without the acetone wash, exhibit a unique combination of high surface area and high-volume, high-diameter pores not exhibited by the siliceous particles of the art.

In certain cases wherein the water-soluble materials present are relatively volatile, it may be possible to eliminate the thawing and washing steps and, instead, "freeze-dry" the frozen mixture by sublimation at reduced pressure. Freeze-drying precludes the existence of the aforesaid capillary forces associated with liquid water. The freeze-dried particles so obtained can be heated at a temperature of about 105° to 300° C., preferably at reduced pressure, to remove the volatile, water-soluble compounds. The above procedure is especially advantageous when the water-soluble compounds are ammonium salts, such as $NH_4Cl$ or $(NH_4)_2CO_3$.

The size of the amorphous poly(alumino-silicate) particles obtained by the process of this invention generally is in the range 10 to 100 μm. The particles can be further subdivided into finer particles, for example, in the 1 to 10 μm range, using conventional techniques, or compacted into coarser granules or pellets, by known mechanical methods. The surface areas and pore volumes of the particles, granules or pellets, are conveniently measured by the well-known B.E.T. (Brunauer, Emmett and Teller) nitrogen adsorption technique. The adsorptive capability of the particles can also be determined by measuring their equilibrium adsorption capacity (EAC) for carbon tetrachloride vapor; see, e.g., Benesi et al, Anal. Chem. 27, 1963-5 (1955). Pore volumes can also be estimated from carbon tetrachloride adsorption data. Average pore diameters can be calculated from B.E.T. surface area and pore volume data, assuming cylindrical pores, as is common in the art, using the formula $$\text{Pore Diameter (Å)} = 10^4(4V/S)$$

where V is the measured pore volume in cc (liquid) per gram (cc/g) and S is the surface area in square meters per gram (m²/g) of particles. The aforesaid tests were employed to obtain data reported in the examples.

The retention of useful properties represented by the combination of high surface area and large pores of the poly(alumino-silicate) particles produced by this invention at elevated temperatures has been demonstrated by heating the particles in air at 800° C. and at 550° C., typical use temperatures (Examples 3 and 4).

It is to be understood that throughout this discussion, the term "poly(alumino-silicate)" is used in a generic sense in that it merely reflects the anionic moiety of the product produced by the invention. It is well understood by one of ordinary skill in the art that the product contains an electrically neutralizing number of alkali metal and/or ammonium cations, or hydrogen ions.

In the following examples of specific embodiments of this invention percentages are by weight; Si/Al ratios are in numbers of gram-atoms.

EXAMPLE 1

A. To a well-stirred solution of 69 cc of commercially available aqueous sodium silicate (28.4% $SiO_2$, 8.7% $Na_2O$; density at 15.6° C.:1.39 g/cc) in 319 cc of deionized water was added as rapidly as possible a solution of 22.3 g of commercially available sodium aluminate ($Na_2Al_2O_4 \cdot 3H_2O$) in 180 cc of deionized water. The resultant solution contained 4.5 wt % $SiO_2$, 1.7 wt % $Al_2O_3$; the Si/Al ratio was about 2.2. The solution gelled in approximately 5 minutes; the gel was aged 30 minutes and then frozen by flotation on acetone, refrigerated to −50° C., for 2 hours. The frozen product was thawed, filtered, washed $SO_4^=$ free with deionized water and dried at 125° C. under reduced pressure.

B. The procedure of A was repeated except that 12 g of $Na_2SO_4$ were dissolved in the sodium silicate solution before the addition of the sodium aluminate. Gel time after mixing of the solutions was less than 1 minute.

C. The procedure of A was repeated except that 40 g of $Na_2SO_4$ were dissolved in the sodium silicate solution before the addition of the sodium aluminate. The mixed solutions gelled immediately.

The dried products from the above preparations exhibited the following properties:

| Wt. % $Na_2SO_4$ based on wt of ($SiO_2$ + $Al_2O_3$) | Equilibrium Adsorption Capacity (g $CCl_4$/g product) | Pore Volume (cc $CCl_4$/g product) | B.E.T. Surface Area (m²/g) | B.E.T. Pore Volume (cc/g) | B.E.T. Pore Diameter (A) |
|---|---|---|---|---|---|
| A. 0 | 0.639 | .40 | 262 | .54 | 82 |
| B. 32 | 0.986 | .62 | 250 | .87 | 139 |
| C. 105 | 2.357 | 1.49 | 199 | 1.63 | 326 |

EXAMPLE 2

Using a multiple-jet mixing nozzle similar to those described on p. 709 of Techniques of Organic Chemistry by A. Weissberger, Vol. VIII, Part II, 1963, Interscience Publishers, 234 cc/min. of sodium silicate solution (46.8 g/min $SiO_2$, 14.4 g/min $Na_2O$), prepared by mixing equal parts by volume of the sodium silicate of Example 1 and deionized water, and 366 cc/min of sodium aluminate solution, prepared by dissolving 283 g of commercially available sodium aluminate ($Na_2Al_2O_4 \cdot 3H_2O$) in 3600 cc of deionized water, were mixed. The resultant solution, which contained 6.9 wt % $SiO_2$ and 2.0 wt % $Al_2O_3$, was collected sequentially in 400 cc plastic dishes. The solution had a gel time of 1–2 seconds. After aging 5 minutes, the alumino-silicate (Si/Al = 3) product was particulated, in the original sequence, to approximately 3.175 mm particles by passing the gel through a mechanical chopper; all except the product in one dish was dropped directly from the chopper into a stirred freezing bath of Freon® 113 Refrigerant at −25° C. at such a rate that all the product to be frozen had been aged 5 to 8 minutes prior to freezing. The particulated product from one dish was retained and designated A for unfrozen product. The frozen gel particles, designated B, were removed from the freezing bath after 2 hours and thawed in water. The unfrozen sample designated A was placed in water, separately, at the same time.

The two product samples were then filtered, washed well with deionized water, slurried in water and the slurry was adjusted to pH 6.5 with 1.8 N $H_2SO_4$, filtered and washed $SO_4^=$ free with deionized water. Sample A was washed with great difficulty because of its gelatinous nature. The products were then dried at 125° C. under reduced pressure. The surface properties as measured by the B.E.T. procedure were:

|   | Surface Area (m²/g) | Pore Vol. (cc/g) | Pore Diameter (A) |
|---|---|---|---|
| A | 283 | 0.54 | 77 |
| B | 281 | 0.96 | 137 |

Utility

Portions of the poly(alumino-silicate) particulate products A and B, together with a commercially available porous alumino-silicate catalyst, were exposed to vapors of $CCl_4$ and their respective equilibrium adsorption capacities for $CCl_4$ were measured, as in Example 1. The results, tabulated below and shown graphically in the figure, clearly demonstrate the superior adsorption capacity of B.

| | Total $CCl_4$ adsorbed (g/g of adsorbent) Days | | | |
|---|---|---|---|---|
| Sample | 1 | 2 | 3 | 4 |
| B | 0.735 | 1.131 | 1.154 | 1.154 |
| A | 0.758 | 0.764 | 0.767 | 0.767 |

-continued

| | Total CCl4 adsorbed (g/g of adsorbent) Days | | | |
|---|---|---|---|---|
| Sample | 1 | 2 | 3 | 4 |
| commercial alumino-silicate | 0.557 | 0.578 | 0.580 | 0.580 |

| | B.E.T. | | |
|---|---|---|---|
| | Surface Area m²/g | Pore Vol. ml/g | Pore Dia. Å |
| B | 281 | 0.96 | 137 |
| A | 283 | 0.54 | 77 |
| commercial alumino-silicate | 325 | 0.45 | 55 |

EXAMPLE 3

Using a multiple-jet mixing nozzle 193 cc/min of sodium silicate solution (64.3 g/min $SiO_2$, 19.8 g/min $Na_2O$), prepared by mixing 5 parts by volume of the sodium silicate of Example 1 with 1 part of deionized water, were mixed with 407 cc/min of sodium aluminate solution, prepared by dissolving 150 g of commercially available $Na_2Al_2O_4.3H_2O$ in 3200 cc of deionized water. The resultant approximately 6:1 Si/Al alumino-silicate solution (gel time approximately 5 seconds) contained 9.4 wt % $SiO_2$ and 1.3 wt % $Al_2O_3$. This solution was aged 30 minutes, particulated, frozen in a cold bath at approximately $-25°$ C. for 2 hours as in Example 2, and then thawed in water. The product slurry was filtered and washed well with deionized water; a sample, after drying, was found to contain 7.7 wt % $Na^+$. The remaining product was reslurried in 3000 cc of water containing 75 cc of concentrated nitric acid for 15 minutes, filtered, washed with water, reslurried in 1000 cc of saturated aqueous $(NH_4)_2CO_3$ solution, filtered, washed with water and dried at 125° C. under reduced pressure. The resultant powdered product contained 69.49 wt % $SiO_2$, 13.67 wt % $Al_2O_3$ (corresponding to a 4.32 Si/Al ratio) and 0.05 wt % $Na^+$ and exhibited the following surface properties as measured by the B.E.T. procedure: surface area 489 m²/g, pore volume 0.9 cc/g and pore diameter 74 Å. This powder was pressed into wafers which were then broken mechanically and screened to $-30$ to $+50$ mesh granules (U.S. Sieve Series), that is, to pass 30 mesh but not 50 mesh screens, and tested as a catalyst for the production of monomethylamine (MMA) and dimethylamine (DMA) in a stream of gases containing $NH_3$, methanol and trimethylamine. In the range of approximately 400°–450° C., the product of this example produced 70% more MMA+DMA per g of catalyst than did a commercially available alumino-silicate which is commonly used in industry in the production of MMA and DMA.

A sample of the product particles was heated in air at 800° C. for 4 hours; the surface area (B.E.T.) was 336 m²/g. A second sample of the product particles was heated in air at 550° C. in sequence (i) for 1 hour; the surface area was 354 m²/g; and (ii) for an additional 3 hours; the surface area was 353 m²/g.

EXAMPLE 4

Following the procedure of Example 3, 224 cc/min of sodium silicate solution (44.8 g/min $SiO_2$, 13.8 g/min $Na_2O$), prepared by mixing equal parts by volume of the sodium silicate of Example 1 and deionized water, and 376 cc/min of sodium aluminate solution, prepared by dissolving 326 g of commercially available $Na_2Al_2O_4.3H_2O$ in 3760 cc of deionized water, were mixed in a multiple-jet mixing nozzle to give an alumino-silicate solution (gel time 2–3 seconds) containing 6.6 wt % $SiO_2$ and 2.3 wt % $Al_2O_3$ (Si/Al=2.6). The resultant gel was aged 5 minutes, particulated, frozen, thawed and washed as in Example 3; a sample, after washing with deionized water only, contained 9.65 wt % $Na^+$. The remaining product was further washed as in Example 3 except that in the final wash aqueous $NH_4NO_3$ solution (approximately 10 wt %) was used in place of the $(NH_4)_2CO_3$ solution. The resultant product contained 62.15 wt % $SiO_2$, 20.30 wt % $Al_2O_3$, and 85 ppm $Na^+$, corresponding to a 2.60 Si/Al ratio, and exhibited the following surface properties as measured by the B.E.T. procedure: surface area, 274 m²/g; pore volume 0.70 cc/g and pore diameter 102 Å.

A sample of the product particles was heated in air at 800° C. for 4 hours; the surface area (B.E.T.) was 186 m²/g. A second sample of the product particles was heated in air at 550° C. in sequence: (i) for 1 hour; the surface area was 225 m²/g; and (ii) for an additional 3 hours; the surface area was 228 m²/g.

EXAMPLE 5

A. A solution of 27 g of commercially available sodium aluminate $(Na_2Al_2O_4.3H_2O)$ in 500 cc of water was filtered and then mixed quickly in a beaker with 75 cc of commercially available sodium silicate (30.5 g of $SiO_2$); the mixture was poured into a 1 liter cylinder. The combined solution which contained 4.8 wt % $SiO_2$ and 2.0 wt % $Al_2O_3$ (Si/Al=2) gelled in 30 seconds. The gel was frozen in the cylinder at $-70°$ C. The frozen gel was thawed, filtered, washed with water and dried at 240° C. The product was largely in the form of flakes having a surface area of 295 m²/g.

B. A solution of 27 g of commercially available sodium aluminate $(Na_2Al_2O_4.3H_2O)$ in 500 cc of water was mixed rapidly with a solution of 75 cc of commercially available sodium silicate (30.45 g of $SiO_2$) in 500 cc water. The resulting solution was poured rapidly into a 1 liter cylinder. This solution which contained 2.8 wt % $SiO_2$ and 1.2 wt % $Al_2O_3$ (Si/Al=2) gelled in 20 seconds. The gel was aged for 100 seconds and then frozen at $-60°$ C. The frozen gel was thawed, filtered and washed with water. One portion (A) was dried at 200° C. for 2 hours. A second portion (B) was washed with concentrated aqueous ammonia and then dried at 200° C. for 3 hours. Following are the B.E.T. data obtained:

| | Surface Area (m²/g) | Pore Volume (cc/g) | Pore Diameter (Å) |
|---|---|---|---|
| A | 258 | 0.48 | 75 |
| B | 305 | 0.63 | 83 |

EXAMPLE 6

Following the procedure of Example 2, particulate poly(alumino-silicate) was prepared by the steps of mixing aqueous sodium silicate and sodium aluminate solutions in a multiple-jet mixing nozzle, aging the gel which formed for 10 minutes, particulating the aged gel directly into a cold stirred Freon® 113 Refrigerant bath at −25° C., removing the frozen gel from the bath after 1 hour and then thawing the gel in water. The thick product slurry was washed in a twenty-plate column as described in U.S. Pat. No. 3,881,876. Aqueous 2.0 molar (NH$_4$)$_2$CO$_3$ solution was passed into the column at about 150 cc/hour five plates above the product exit and deionized water was passed into the column at the discharge plate of the column at about 300 cc/hour. The product slurry from the column was filtered and dried at 125° C. under reduced pressure. The product was analyzed and found to contain 24.54% Si, 9.93% Al, 0.21% Na and 5.05% N. The Si/Al atom ratio in the product was 2.38:1. The washed product contained 0.98 equivalent of NH$_4^+$ and 0.02 equivalent of Na$^+$ (1 equivalent before washing) for each equivalent of aluminum in the product (NH$_4$)$_{0.98}$Na$_{0.02}$AlO$_2$(SiO$_2$)$_{2.38}$. The surface properties of the washed and dried product, as measured by the B.E.T. procedure, were: surface area, 392 m$^2$/g; pore volume, 1.00 cc/g; and average pore diameter, 101 Å.

EXAMPLE 7

Following the procedure of Example 2, 234 cc/min of sodium silicate solution, prepared by mixing equal parts by volume of the commercial sodium silicate of Example 1 and deionized water, and 366 cc/min of sodium aluminate solution, prepared by dissolving 283 g of commercially available sodium aluminate (Na$_2$Al$_2$O$_4$.3H$_2$O) in 3600 cc of deionized water, were mixed in a multiple-jet mixing nozzle to give an alumino-silicate solution (gel time 2-3 sec) with a Si/Al gram-atomic ratio of about 3:1. The resultant gel was aged 10 minutes, particulated and frozen; the frozen gel was then thawed in water and the particulate product was recovered by filtration. The product was washed in a 20 plate countercurrent washing column with about 300 cc/hr of saturated aqueous (NH$_4$)$_2$CO$_3$ solution as the countercurrent washing fluid. The washed product from the column was recovered by filtration and washed free of (NH$_4$)$_2$CO$_3$ with deionized water. One portion of this product was then dried at 125° C. under reduced pressure. The resultant powdered product contained 28.90 wt % Si, 10.19 wt % Al (corresponding to a 2.74 Si/Al gram-atomic ratio) and 0.21 wt % Na and exhibited the following surface properties as measured by the B.E.T. procedure: surface area, 406 m$^2$g; pore volume, 0.96 cc/g; and pore diameter, 95 Å. The other portion of this product was washed three times with acetone, then, with acetone which had been dried over molecular sieves; the product then was dried at 125° C. under reduced pressure. This powdered product exhibited the following surface properties as measured by the B.E.T. procedure: surface area, 447 m$^2$/g; pore volume, 1.35 cc/g; and pore diameter, 121 A.

BEST MODE FOR CARRYING OUT THE INVENTION

The best mode for carrying out this invention is described by Examples 3, 4, 6 and 7.

INDUSTRIAL APPLICABILITY

The industrial applicability of the process of this invention is demonstrated by all the examples herein. The industrial applicability of the product of this invention is demonstrated by the adsorptivity, surface area and porosity data reported in Examples 1 to 7 and by the catalytic activity reported in Example 3.

We claim:

1. Process for preparing particulate, porous, water-insoluble amorphous poly(alumino-silicate) having a Si/Al gram-atomic ratio of about 1:1 to 10:1, a pore volume of greater than 0.5 ml/g, an average pore diameter of 50 to 200 Å and a surface area of 200 to 600 m$^2$/g by mixing an aqueous solution of an appropriate aluminate and an aqueous solution of an appropriate silicate, allowing the aluminate and silicate in the resultant mixture to polymerize to poly(alumino-silicate), freezing the mixture and thereafter thawing the mixture and isolating, washing, drying and recovering particulate poly(alumino-silicate) therefrom, said process characterized in that:

(a) the amounts, respectively, of aluminate and silicate, calculated as Al$_2$O$_3$ and SiO$_2$, are such that the total amount thereof in the mixture is about 4 to 25 weight % of the mixture, such that the Si/Al gram-atomic ratio in the mixture is about 1:1 to 10:1, and such that the amount, in the mixture, of at least one water-soluble compound which is precipitable from the mixture at −10° to −100° C. and which is inert to the aluminate, silicate and poly(alumino-silicate) is about 25 to 160 weight %, based on the combined weights of aluminate and silicate, calculated as Al$_2$O$_3$ and SiO$_2$; and (b) the mixture is cooled to about −10° to −100° C. until it is frozen, to separate substantially all of the chemically unbound water as substantially pure ice, and to precipitate water-soluble compound within the pores of the poly(alumino-silicate) particles being formed.

2. Process of claim 1 wherein the aluminate and silicate in the mixture are polymerized until a gel is formed before the mixture is frozen.

3. Process of claim 2 wherein the gel is aged before the mixture is frozen.

4. Process of claim 3 wherein aging is carried out for up to 60 minutes; in (a), the total amount of aluminate and silicate is about 5 to 15 weight %, the Si/Al gram-atomic ratio is 1.5:1 to 7:1, and the mixture contains about 25 to 75 weight % of water-soluble compound; and, in (b), freezing is carried out at −15° to −35° C.

5. Process of claim 1 wherein the washing of particulate product includes an aqueous acid wash.

6. Process of claim 1 wherein the washing of particulate product includes use of an aqueous solution of an ammonium salt.

7. Process of claim 1 wherein the particulate product is washed by countercurrent washing.

8. Process of claim 1 wherein the aluminate is an alkali metal aluminate and the silicate is an alkali metal silicate.

9. Process of claim 8 wherein the alkali metal is sodium.

10. Process of claim 1 wherein, in (a), the mixture contains about 75 to 160 weight % of water-soluble compound.

11. Process of claim 10 wherein the water-soluble compound is a salt of an alkali or alkaline earth or ammonium cation and a mineral acid.

12. Process of claim 11 wherein the mineral acid is sulfuric, hydrochloric or nitric acid.

13. Process of claim 12 wherein the water-soluble compound is sodium sulfate.

14. Process of claim 2 wherein the gel is granulated before the mixture is frozen.

15. Process of claim 1 wherein the aqueous aluminate and silicate solutions are mixed in a mixing nozzle.

16. Process of claim 1 wherein the aqueous aluminate and silicate solutions are mixed in a mixing nozzle and the particulate product is washed by countercurrent washing.

* * * * *